United States Patent [19]
Shiraishi et al.

[11] Patent Number: 5,727,447
[45] Date of Patent: Mar. 17, 1998

[54] SUPERCHARGE PRESSURE CONTROL APPARATUS

[75] Inventors: Kazunari Shiraishi, Hyogo; Hidetoshi Okada; Sotsuo Miyoshi, both of Tokyo, all of Japan

[73] Assignee: Mitsubishi Denki Kabushiki Kaisha, Tokyo, Japan

[21] Appl. No.: 581,252

[22] Filed: Dec. 29, 1995

[30] Foreign Application Priority Data

Sep. 27, 1995 [JP] Japan .................. 7-249623

[51] Int. Cl.⁶ ........................................ F01B 31/00
[52] U.S. Cl. .................. 92/164; 92/161; 92/163; 92/128; 92/98 D
[58] Field of Search .................. 92/161, 163, 164, 92/98 D, 128

[56] References Cited

U.S. PATENT DOCUMENTS

| 3,200,717 | 8/1965 | Einsiedler | 92/163 |
| 3,408,899 | 11/1968 | Golden | 92/163 |
| 4,259,895 | 4/1981 | Owens | 92/161 |
| 4,506,808 | 3/1985 | Goncalves . | |

FOREIGN PATENT DOCUMENTS

| 398 379 | 11/1990 | European Pat. Off. . |
| 567 679 | 4/1992 | European Pat. Off. . |
| 1193026 | 8/1989 | Japan . |
| 673407 | 10/1994 | Japan . |
| 730966 | 7/1995 | Japan . |
| 2 263 516 | 7/1993 | United Kingdom . |

*Primary Examiner*—Thomas E. Denion
*Attorney, Agent, or Firm*—Sughrue, Mion, Zinn, Macpeak & Seas, PLLC

[57] ABSTRACT

A supercharge pressure control apparatus comprises a crimped member for securing an enclosure to a mounting member fixed in an internal combustion engine by crimping, a notch formed at one end portion of the crimped member for preventing the end portion from becoming cracked, a diaphragm disposed inside the enclosure for partitioning the interior of the enclosure into a first pressure room and a second pressure room, a holder disposed on the diaphragm and inside the second pressure room, a spring disposed inside the second pressure room for urging the diaphragm in the direction of the first pressure room or in the opposite direction through the holder, and a rod which is able to move backward and forward in accordance with the pressure of gas applied to the first pressure room for controlling the pressure of air to be supplied into the internal combustion engine. Furthermore, the mounting member has a generally circle-shaped hole through which the rod is penetrated, and the crimped member is crimped over an edge portion of the mounting member surrounding the hole so as to rigidly secure the enclosure to the mounting member.

19 Claims, 16 Drawing Sheets

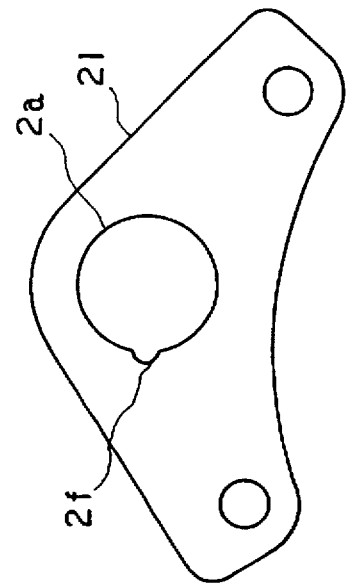
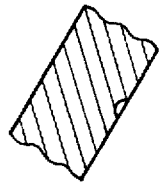
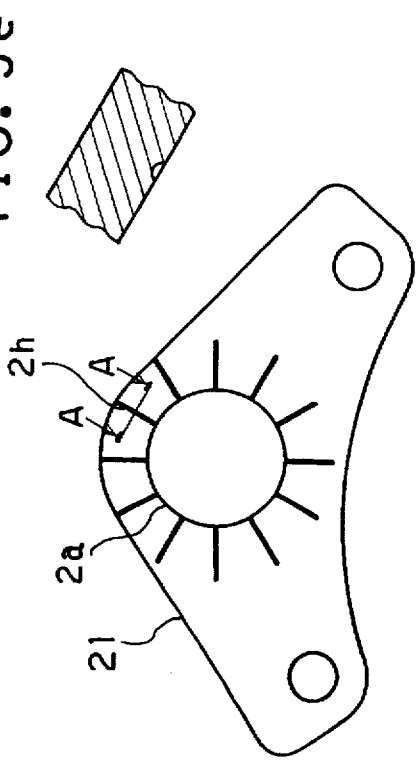
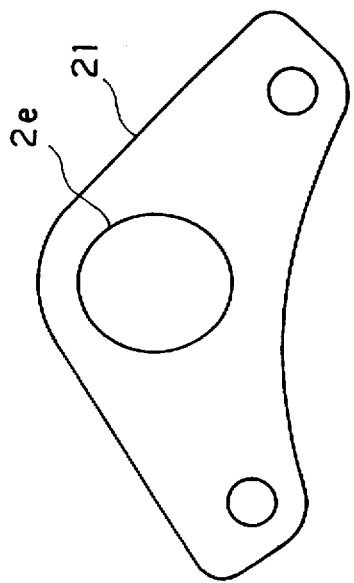
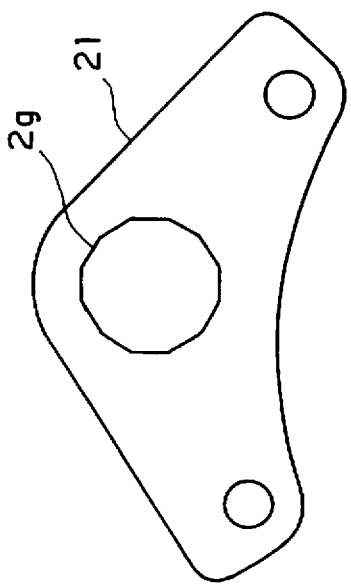

SUPERCHARGE PRESSURE CONTROL APPARATUS

BACKGROUND OF THE INVENTION

1. Field of the Invention

The present invention relates to a supercharge pressure control apparatus which controls the supercharge pressure of a turbocharger disposed in an internal combustion engine.

2. Description of the Prior Art

Referring now to FIG. 20, it illustrates a cross-sectional view of a prior art supercharge pressure control apparatus disclosed in for example Japanese Utility Model No. 62-33123. In the figure, reference numeral 1 denotes a securing member integrally disposed in the main body of an internal combustion engine, 2 denotes a mounting member secured to the securing member 1, 3 denotes a bolt for securing the mounting member 2 to the securing member 1, 4 denotes a housing rigidly fixed to the mounting member 2 by welding, copper-alloy brazing, or the like, 4a denotes a vent formed at one end portion of the housing 4 for communicating with the atmosphere, and 5 denotes a diaphragm, which is of thin-film shape, sandwiched between the housing 4 and a case 6 for partitioning the interior surrounded by the housing 4 and case 6 into a first pressure room 200a and a second pressure room 200b.

Furthermore, reference numeral 7 denotes a pressure applying port connected to the case 6, 8 denotes a pressure room-side holder, which is of generally plate shape, mounted on one surface of the diaphragm 5, 9 denotes an atmospheric room-side holder mounted on the other surface of the diaphragm 5, 10 denotes a rod penetrating through the vent 4a for communicating with the atmosphere, one end portion 10a thereof being rigidly secured to the pressure room-side holder 8, diaphragm 5, and pressure room-side holder 9, 10b denotes the other end portion of the rod 10, 11 denotes a guide for limiting swaying movements of the rod 10, 12 denotes a spring disposed between the atmospheric room-side holder 9 and guide 11 for urging the diaphragm 5 toward the case 6, and 13 denotes a lever used to drive the control valve. The lever 13 is connected to the other end portion 10b of the rod 10.

Next, the description will be directed to the operation of the prior art supercharge pressure control apparatus. The rod 10 is mounted so that the spring 12 is pressed toward the control valve driving lever 13 by a predetermined length. The amount of displacement of the diaphragm 5 is determined by the balance between the difference between the pressures in the first and second pressure rooms 200a and 200b, and the load imposed on the spring 12. When no positive pressure is applied to the first pressure room 200a, that is, when a force exerted on the diaphragm 5 due to the pressure inside the first pressure room 200a is approximately equal to or lower than the urging force of the spring 12, the diaphragm 5 positions the front end portion of the pressure room-side holder 8 in the vicinity of the inside wall of the case 6 within the first pressure room 200a.

When a positive pressure is applied to the first pressure room 200a via the pressure applying port 7, that is, when the pressure in the first pressure room 200a is greater than the sum of the atmospheric pressure in the second pressure room 200b and the urging force of the spring 12, the diaphragm 5 is shifted against the elastic force of the spring 12 and toward the second pressure room 200b in accordance with the magnitude of the positive pressure. This shift of the diaphragm 5 is further transmitted to outside the housing 4 via the rod 10. The transmission causes the control valve driving lever 13 to act to open the waste gate valve (not shown in the figure) disposed in the turbocharger, thereby reducing the number of revolutions of the turbine and hence controlling the pressure of supercharge to be supplied into the internal combustion engine.

In the prior art supercharge pressure control apparatus having such the structure mentioned above, the housing is rigidly fixed to the mounting member by welding, copper-alloy brazing, or the like. Therefore, the apparatus suffers from the disadvantage that it is expensive in manufacturing because the cost of manufacturing includes the cost of a facility for welding or copper-alloy brazing in addition to the cost of working and materials cost.

Another disadvantage is that, when an edge portion of the housing is crimped on the mounting member in order to reduce the cost of manufacturing the supercharge pressure control apparatus, the crimped edge is easily cracked and hence the resistance of the apparatus to vibrations or the like is decreased.

Furthermore, there are large variations in the sizes of the rod and other components which are correlated with the characteristics of the internal combustion engine because they are manufactured by molding, press working, and the like. Therefore, if the distance between the mounting member and the other end of the rod is greater than a predetermined distance, the amount of change in the length of the compressed spring decreases in accordance with the variation in the distance and hence the apparatus operates from a pressure lower than usual, thereby causing a reduction in the pressure of supercharges and hence reducing the power of the internal combustion engine. On the contrary, if the distance between the mounting member and the other end of the rod is less than a predetermined distance, the amount of change in the length of the compressed spring increases in accordance with the variation in the distance and hence the apparatus does not operates unless a pressure greater than usual is applied thereto, thereby causing an increase in the pressure of supercharges resulting in having a deleterious effect such as breakage on the internal combustion engine.

A further disadvantage is that, when manufacturing the rod by cutting work, or controlling the effective length of the rod with a screw mechanism including a joint 14 and a hexagon not 15, as shown in FIG. 21, in order to reduce the aforementioned variations in the effective length of the rod, this causes an increase in the cost of components or an increase in the number of components resulting in an increase in the cost of manufacturing the supercharge pressure control apparatus.

The case (or housing) is manufactured by drawing work and the pressure applying port is manufactured of a pipe or the like. When combining the case and pressure applying port which have been manufactured in this way as two separate components, the binding strength sufficient to secure the pressure applying port to the case and airtightness are required between them. Temporarily crimping the pressure applying port onto the case and then fixing them together by copper-alloy brazing for ensuring the binding strength and airtightness require high materials cost and high working cost resulting in an increase in the cost of manufacturing.

A still further disadvantage is that, when the case and pressure applying port are formed in one piece of a resin, an impact from outside the apparatus easily causes damage to the pressure applying port because its strength is not sufficient.

SUMMARY OF THE INVENTION

The purpose of the present invention is to overcome these disadvantages. More precisely, an object of the present invention is to provide a supercharge pressure control apparatus, which is able to reduce working and materials costs, having high resistance to vibrations created by an internal combustion engine and the like.

It is another object of the present invention to provide a supercharge pressure control apparatus which is able to prevent mechanical stress produced therein due to vibrations created by an internal combustion engine from concentrating onto only a part thereof.

It is a further object of the present invention to provide a supercharge pressure control apparatus which is able to improve the strength of a crimped portion for rigidly fixing the apparatus to an internal combustion engine at will.

It is a still further object of the present invention to provide a supercharge pressure control apparatus which is able to control the position of a rod, which moves backward and forward to control the pressure of air to be supplied into an internal combustion engine, by plastically deforming a holder secured to one end of the rod, thereby reducing the cost of manufacturing through the use of components manufactured with low accuracy by a low-cost working method such as press working and further compensating for variations in the characteristics of the apparatus without an adjustment mechanism such as the screw mechanism mentioned above.

It is a still further object of the present invention to provide a supercharge pressure control apparatus wherein a case and a pressure applying port are formed in one piece of a resin to compensate for the lack of the strength of the pressure applying port.

In accordance with a first aspect of the present invention, there is provided a supercharge pressure control apparatus, which is rigidly fixed in an internal combustion engine with a mounting member, comprising a crimped member for securing an enclosure to the mounting member by crimping, and a notch formed at one end portion of the crimped member for preventing the end portion from becoming cracked.

In accordance with a second aspect of the present invention, the supercharge pressure control apparatus further comprises a diaphragm disposed inside the enclosure for partitioning the interior of the enclosure into a first pressure room and a second pressure room, a holder disposed on the diaphragm and inside the second pressure room, a spring disposed inside the second pressure room for urging the diaphragm in the direction of the first pressure room or in the opposite direction through the holder, and a rod, which is able to move backward and forward in accordance with the pressure of gas applied to the first pressure room, for controlling the pressure of air to be supplied into the internal combustion engine, one end of the rod being secured to the holder and the other end of the rod projecting outward from the enclosure.

In accordance with a third aspect of the present invention, the mounting member has a generally circle-shaped hole through which the rod is penetrated. Furthermore, the crimped member is crimped over an edge portion of the mounting member surrounding the hole so as to rigidly secure the enclosure to the mounting member.

In accordance with a fourth aspect of the present invention, the edge portion of the mounting member surrounding the generally circle-shaped hole is inclined outward against the enclosure. Furthermore, the crimped member projects from the enclosure so that it is crimped over the inclined edge portion.

In accordance with a fifth aspect of the present invention, the crimped member is not integrally formed on the enclosure. Furthermore, the enclosure is mounted on the mounting member in such a manner that an end portion of the enclosure is sandwiched between the crimped member and the edge portion of the mounting member surrounding the generally circle-shaped hole.

In accordance with a sixth aspect of the present invention, there is provided a supercharge pressure control apparatus comprising a diaphragm disposed inside the enclosure for partitioning the interior of the enclosure into a first pressure room and a second pressure room, a holder disposed on the diaphragm and inside the second pressure room, a spring disposed inside the second pressure room for urging the diaphragm in the direction of the first pressure room or in the opposite direction through the holder, and a rod, which is able to move backward and forward in accordance with the pressure of gas applied to the first pressure room, for controlling the pressure of air to be supplied into the internal combustion engine, one end of the rod being secured to the holder and the other end of the rod projecting outward from the enclosure, the holder being able to be plastically deformed to control the position of the rod in accordance with the pressure of supercharges.

In accordance with a seventh aspect of the present invention, there is provided a supercharge pressure control apparatus, which is rigidly fixed in an internal combustion engine with a mounting member, comprising a crimped member for securing an enclosure to the mounting member by crimping, a diaphragm disposed inside the enclosure for partitioning the interior of the enclosure into a first pressure room and a second pressure room, a holder disposed on the diaphragm and inside the second pressure room, a spring disposed inside the second pressure room for urging the diaphragm in the direction of the first pressure room or in the opposite direction through the holder, a rod, which is able to move backward and forward in accordance with the pressure of gas applied to the first pressure room, for controlling the pressure of air to be supplied into the internal combustion engine, one end of the rod being secured to the holder and the other end of the rod projecting outward from the enclosure, a molded case for forming the first pressure room in cooperation with the diaphragm, a housing for forming the second pressure room in cooperation with the crimped member, a pressure applying port integrally formed on a surface of the case and extending in approximately parallel with the surface for applying the pressure of air to the case, and projections disposed on both sides of the pressure applying port for preventing the pressure applying port from becoming broken.

In accordance with a eighth aspect of the present invention, there is provided a supercharge pressure control apparatus, which is rigidly fixed in an internal combustion engine with a mounting member, comprising a crimped member for securing an enclosure to the mounting member by crimping, a diaphragm disposed inside the enclosure for partitioning the interior of the enclosure into a first pressure room and a second pressure room, a holder disposed on the diaphragm and inside the second pressure room, a spring disposed inside the second pressure room for urging the diaphragm in the direction of the first pressure room or in the opposite direction through the holder, a rod, which is able to move backward and forward in accordance with the pressure of gas applied to the first pressure room, for controlling the pressure of air to be supplied into the internal combustion engine, one end of the rod being secured to the holder and the other end of the rod projecting outward from the enclosure, a molded case for forming the first pressure room in cooperation with the diaphragm, a housing for forming the second pressure room in cooperation with the crimped member, a pressure applying port integrally formed on a surface of the case and extending in approximately parallel with the surface for applying the pressure of air to the case, and a rib disposed inside the pressure applying port for preventing the port from becoming broken.

Further objects and advantages of the present invention will be apparent from the following description of the preferred embodiments of the invention as illustrated in the accompanying drawings.

BRIEF DESCRIPTION OF THE DRAWINGS

FIGS. 5a to 5d are plan views of other examples of a hole in the mounting member having different shapes in accordance with the first embodiment of the present invention;

DETAILED DESCRIPTION OF THE PREFERRED EMBODIMENTS

Figure 1:
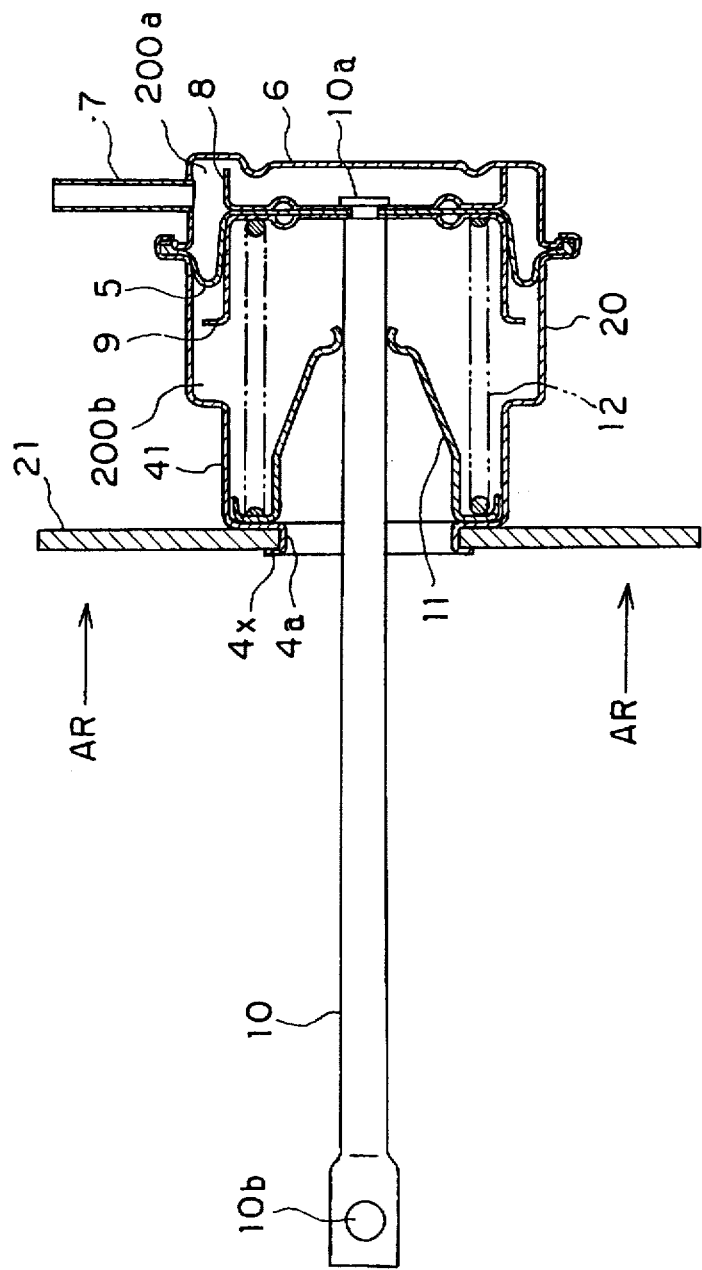
FIG. 1 is a cross-sectional view of a supercharge pressure control apparatus according to a first embodiment of the present invention.

Turning next to the accompanying drawing, in the several figures of which like reference numerals identify identical or like elements, several alternate embodiments will now be described. In the following preferred embodiments, the description about the same elements as in the prior art apparatus and other embodiments which will be explained in advance will be omitted hereinafter.

Referring now to FIG. 1, it illustrates a cross-sectional view of a supercharge pressure control apparatus according to a first embodiment of the present invention. In the figure, reference numeral 21 denotes a mounting member secured to a securing member (not shown in FIG. 1) of the main body of an internal combustion engine, 41 denotes a housing rigidly secured to the mounting member 21 by crimping, 4a denotes a vent which is formed at one end portion of the housing 41 and which is communicated with the atmosphere, 5 denotes a thin-film shaped diaphragm sandwiched between the housing 41 and a case 6, 20 denotes an enclosure constructed by the housing 41 and case 6, 200a denotes a first pressure room surrounded by the case 6 and diaphragm 5, 200b denotes a second pressure room surrounded by the housing 41 and diaphragm 5, and 4x denotes a crimped member integrally formed on the housing 41 for rigidly securing the housing 41 to the mounting member 21.

Furthermore, reference numeral 7 denotes a pressure applying port secured to the case 6, 8 denotes a pressure room-side holder, which is of generally plate shape, mounted on one surface of the diaphragm 5, 9 denotes an atmospheric room-side holder mounted on the other surface of the diaphragm 5, 10 denotes a rod penetrating through the vent 4a, one end portion 10a thereof being ripidly secured to the pressure room-side holder 8, diaphragm 5, and pressure room-side holder 9, 11 denotes a guide for limiting swaying movements of the rod 10, 12 denotes a spring disposed between the atmospheric room-side holder 9 and the guide 11 for urging the diaphragm 5 toward the case 6, and 10b denotes the other end portion of the rod 10, which is attached to a lever (not shown in FIG. 1) used to drive a control valve.

Figure 2:
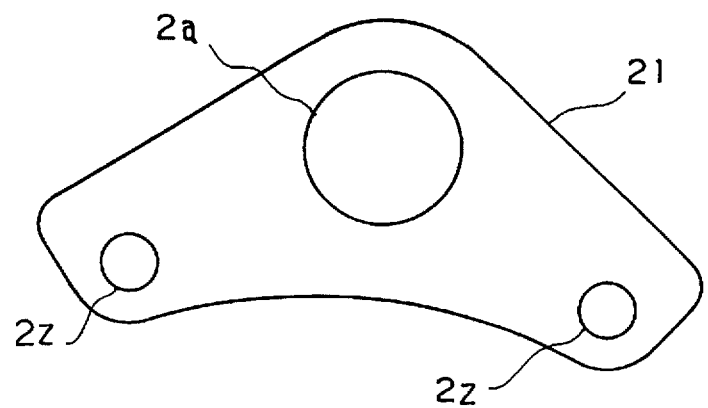
FIG. 2 is a plan view of a mounting member when viewed in the direction of the arrow AR in FIG. 1.

Referring now to FIG. 2, it illustrates a plan view of the mounting member 21 when viewed in the direction of the arrow AR. In the figure, reference numeral 2a denotes a circle-shaped hole, the diameter of which is greater than that of the vent 4a in the housing 41 by the thickness of the crimped member 4x, and 2z denotes a hole for a bolt for securing the mounting member 21 to the securing member of the main body of the internal combustion engine.

Figure 3:
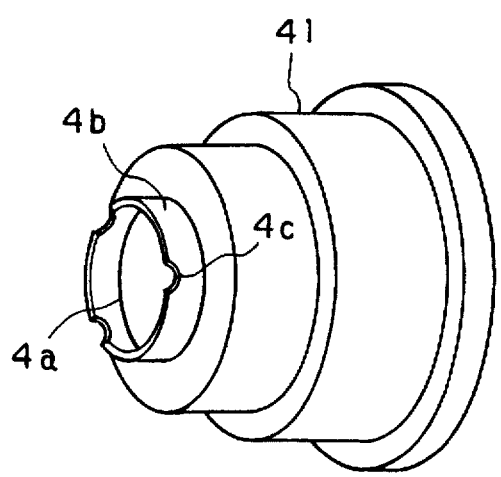
FIG. 3 is a perspective view showing the structure of a housing shown in FIG. 1.

Referring now to FIG. 3, it illustrates a perspective view showing the structure of the housing 41 shown in FIG. 1. In the figure, reference character 4b denotes a cylindrical portion, the free end part of which will construct the crimped member 4x shown in FIG. 1, formed by drawing an edge portion of the housing surrounding the vent 4a in the housing 41, and 4c denotes a half-round notch formed at the end part of the cylindrical portion 4b.

Figure 20:
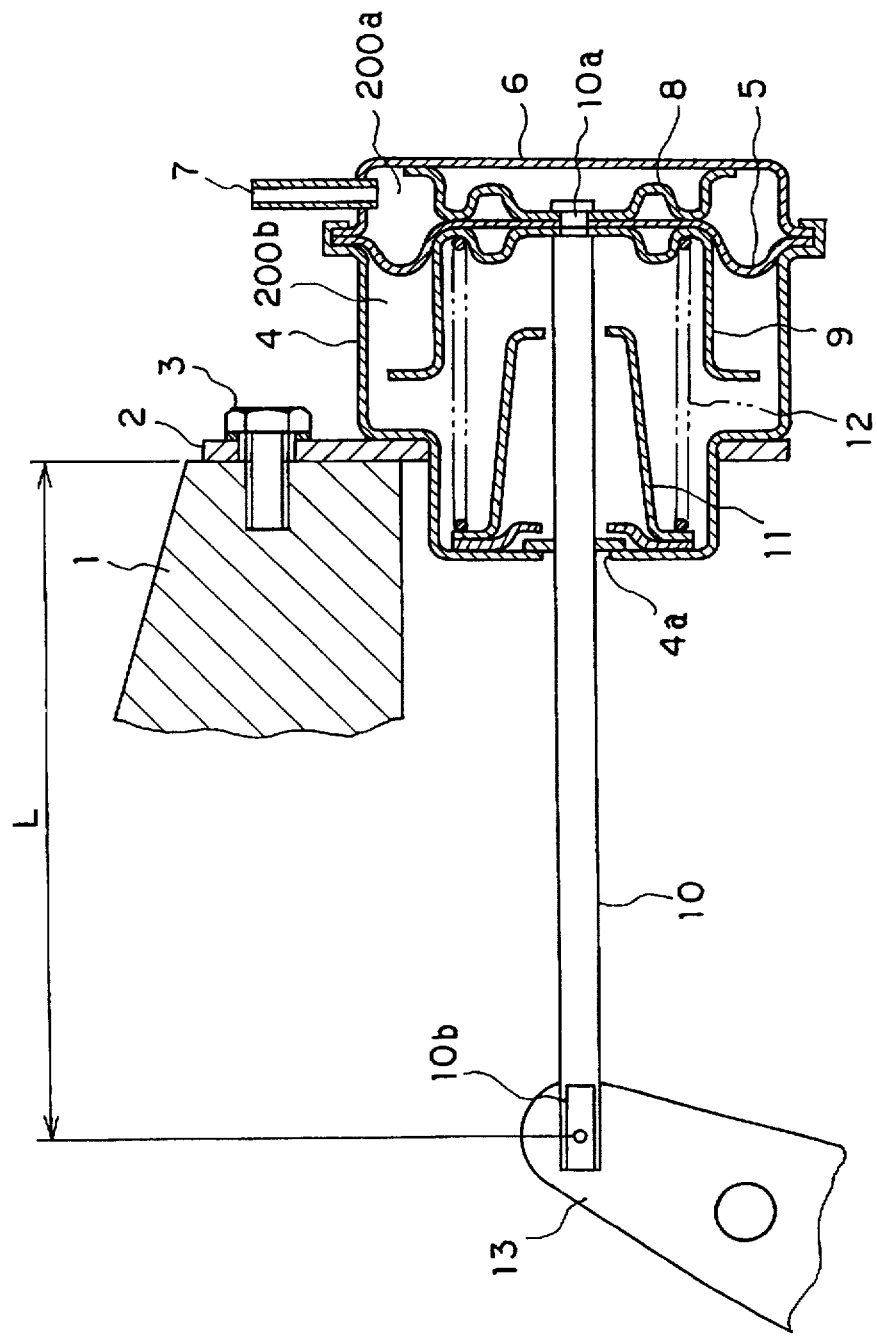
FIG. 20 is a cross-sectional view of a prior art supercharge pressure control apparatus.

Next, the description will be directed to the operation of the supercharge pressure control apparatus of this embodiment. The rod 10 is mounted in such a manner that the spring 12 is shifted and pressed, through a predetermined distance, toward the control valve driving lever. The operation of the supercharge pressure control apparatus is substantially similar to that of the prior art supercharge pressure control apparatus shown in FIG. 20. As previously explained, the amount of displacement of the diaphragm 5 is determined by the balance between the difference between the pressures in the first and second pressure rooms 200a and 200b, and the load imposed on the spring 12.

When no positive pressure is applied to the first pressure room 200a, that is, when a force exerted on the diaphragm 5 due to the pressure inside the first pressure room 200a is approximately equal to or lower than the urging force of the spring 12, the diaphragm 5 makes the front end portion of the pressure room-side holder 8 be positioned in the vicinity of the inside wall of the case 6 within the first pressure room 200a by means of the elastic force of the spring 12. When a positive pressure is applied to the first pressure room 200a via the pressure applying port 7, that is, when the pressure in the first pressure room 200a is greater than the urging force of the spring 12, the diaphragm 5 is shifted against the elastic force of the spring 12 and toward the second pressure room 200b in accordance with the magnitude of the positive pressure. This displacement of the diaphragm 5 is further transmitted to outside the housing 41 via the rod 10. The transmission causes the control valve driving lever (not shown in FIG. 1) to act to open the waste gate valve (not shown in the figure) disposed in the turbocharger, thereby reducing the number of revolutions of the turbine and hence controlling the pressure of supercharges to be supplied into the internal combustion engine.

Figure 4A:
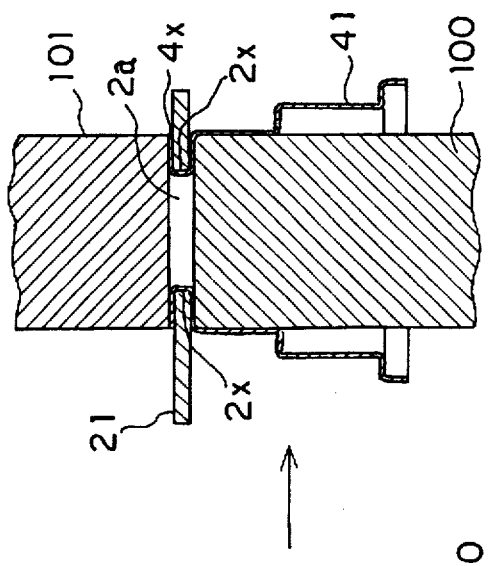
FIGS. 4a to 4c are partly cross-sectional views showing the crimping process in which the housing in FIG. 1 is rigidly secured to the mounting member by crimping.
Figure 4B:
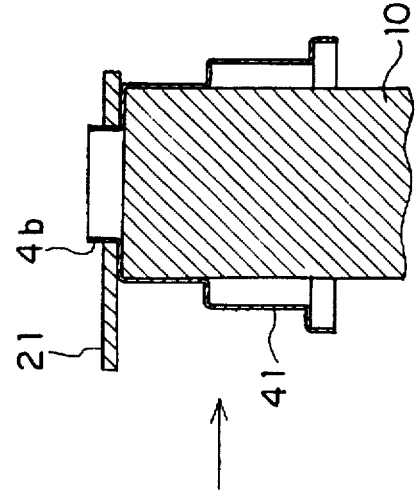
Figure 4C:
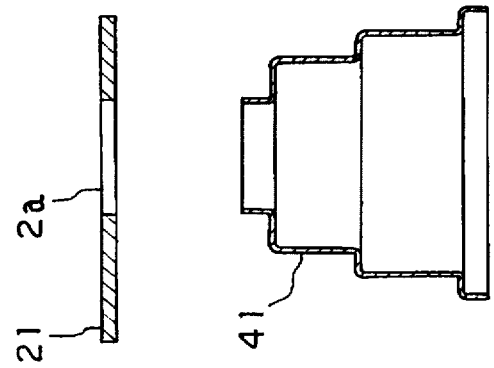

Referring now to FIGS. 4a to 4c, they illustrate partly cross-sectional views showing the process of rigidly securing the housing 41 to the mounting member 21 by crimping. In the figure, reference numerals 101 and 101 denote jigs used for crimping, and 2x denotes an edge portion of the mounting member 21 surrounding the circle-shaped hole aa.

Next, the description will be directed to the crimping process. The housing 41 is rigidly secured to the mounting member 21 by the crimped process; placing the housing 41 and mounting member 21 shown in FIG. 4a on the jig 100, as shown in FIG. 4b, pressing them downward by means of the other jig 101, as shown in FIG. 4c, and bending the cylindrical portion 4b of the housing 41 outward in the direction of the edge portion of the mounting member surrounding the hole 2a. Thus, the crimped member 4x of the housing 41 rigidly secures the housing 41 to the mounting member 21 in such a manner that it holds the perimeter 2x of the mounting member 21 surrounding the circle-shaped hole 2a between its bend portions. The notches 4c formed at the end part of the cylindrical portion 4b can prevent the end part from becoming cracked when the end part of the cylindrical portion 4b is stretched outward in the direction of the edge portion of the mounting member during the crimping process.

In order to improve the accuracy of forming the crimped member 4x, the crimping process may include the following two steps; crimping the end part of the cylindrical portion 4b so that it forms an angle of 45 degrees with respect to the direction orthogonal to the top and bottom surfaces of the mounting member 21, and finally bending the end part into an angle of 90 degrees with respect to the direction orthogonal to the top and bottom surfaces of the mounting member 21 to obtain the crimped member 4x having the desired final shape.

As shown in FIG. 2, the hole 2a disposed in the mounting member 21 is of circle shape. Alternatively, the hole 2a can be of other shape. FIGS. 5a to 5d are plan views of other examples of the hole in the mounting member 21 having different shapes. In FIG. 5a, the mounting member 21 provided with a ellipse-shaped hole 2e is shown. In FIG. 5b, the mounting member 21 provided with a notch 2f formed at the perimeter of thereof surrounding the circle-shaped hole 2a for preventing the turning of the cylindrical portion 4b of the housing 41 is shown. In FIG. 5c, the mounting member 21 provided with a dodecagon-shaped hole 2g is shown. In FIG. 5d, the mounting member 21 provided with recesses 2h formed at the perimeter thereof surrounding the circle-shaped hole 2a is shown. FIG. 5e shows a cross-sectional view taken along the line A—A of FIG. 5d.

When securing the cylindrical portion 4b of the housing 41 to each of the ellipse-shaped hole 2e, hole 2a with the notch 2f for preventing the turning of the cylindrical portion, dodecagon-shaped hole 2g, or hole 2a with the radial recesses 2h by crimping, the crimped part is dug into the perimeter of the mounting member surrounding the hole. As a result, the turning of the cylindrical portion 4b with respect to the mounting member 21 is prevented. Therefore, even though the housing 41 vibrates due to the vibrations created by the internal combustion engine, the housing 41 does not rotate and remains its state wherein it is rigidly secured to the mounting member 21.

Instead of the half-round notches 4c shown in FIG. 3, the cylindrical portion 4b of the housing 41 may be provided with a plurality of notches which are of other than half circle shape. This variant can offer the same advantage.

Figure 6:
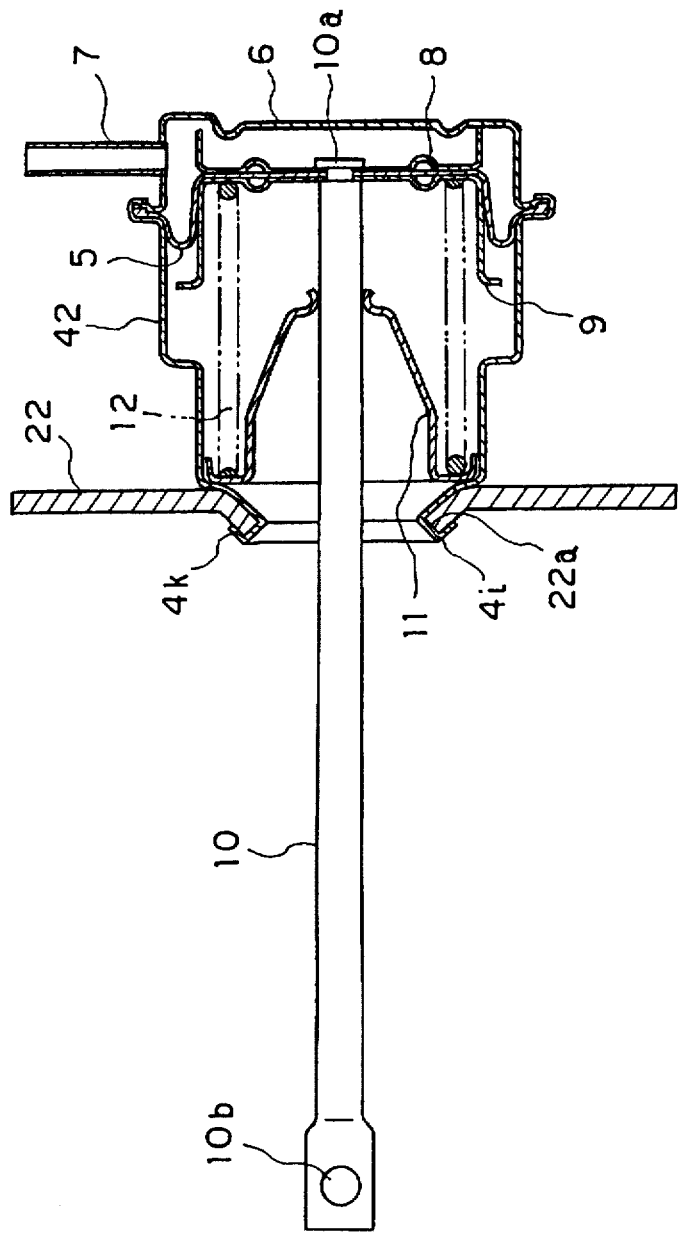
FIG. 6 is a cross-sectional view of a supercharge pressure control apparatus according to a second embodiment of the present invention.
Figure 7A:
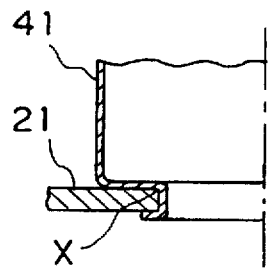
FIGS. 7a to 7d are partly cross-sectional views of the housing according to the first embodiment of the present invention, showing its behavior when it vibrates in the direction of its axis.
Figure 7B:
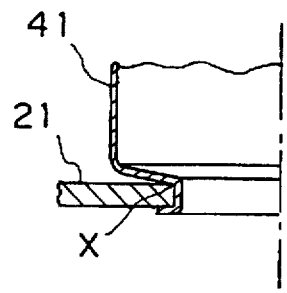
Figure 7C:
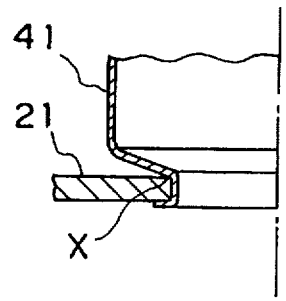
Figure 7D:
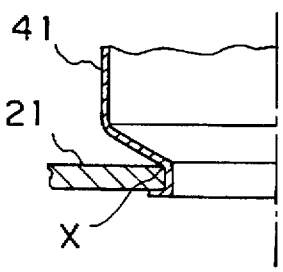
Figure 8A:
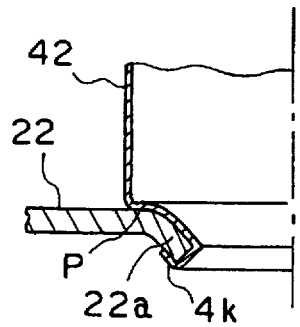
FIGS. 8a to 8d are partly cross-sectional views of the housing according to the second embodiment of the present invention, showing its behavior when it vibrates in the direction of its axis.
Figure 8B:
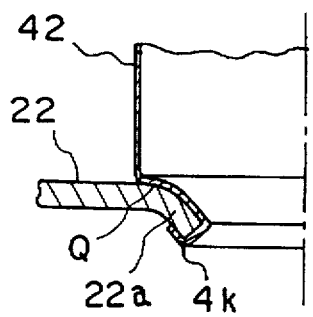
Figure 8C:
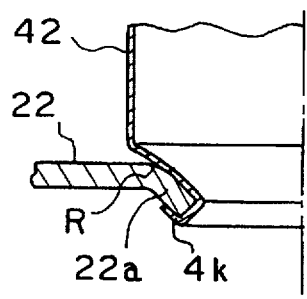
Figure 8D:
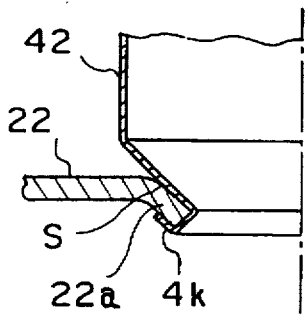

Referring now to FIG. 6, it illustrates a cross-sectional view of a supercharge pressure control apparatus according to a second embodiment of the present invention. In the figure, reference numeral 22 denotes a mounting member according to this embodiment, 42 denotes a housing according to this embodiment, 22a denotes an edge portion of the mounting member 22 surrounding a circle-shaped hole, 4i denotes an edge portion of the housing 42 surrounding a vent communicated with the atmosphere, and 4k denotes a crimped member formed at the end portion of the perimeter 4i of the housing surrounding the vent. The operation of the supercharge pressure control apparatus shown in FIG. 6 is substantially similar to that of the apparatus according to the first embodiment shown in FIG. 1 and therefore the description about the operation will be omitted.

As shown in FIG. 6, according to this embodiment, the perimeter 22a of the mounting member 22 surrounding the circle-shaped hole is inclined outward against the housing 42 and the crimped member 4k also projects outward from one surface of the housing 42 and is crimped in such a manner that it fits over the inclined perimeter 22a. Therefore, the strength of the housing 42 can be improved because the position onto which mechanical stress, which is produced when the housing 42 vibrates with respect to the mounting member 22 during the internal combustion engine runs, is concentrated is varied. The details of this improvement will be described with reference to FIGS. 7 and 8.

FIGS. 7a to 7d illustrate partly cross-sectional views showing the position onto which mechanical stress is concentrated when the housing 41 vibrates with respect to the mounting member 21, in the supercharge pressure control apparatus according to the first embodiment, in which the perimeter of the housing 41 surrounding the vent is crimped over the perimeter of the mounting member 21. FIGS. 8a to 8d illustrate partly cross-sectional views showing the positions onto which mechanical stress are exerted when the housing 41 vibrates with respect to the mounting member 21, in the supercharge pressure control apparatus according to the second embodiment, in which both the perimeter of the mounting member 22 surrounding the circle-shaped hole and the perimeter of the housing 42 surrounding the vent communicated with the atmosphere project outward from the housing 42.

As can be seen from FIGS. 7a to 7d, in the first embodiment, the relative position of the housing 41 with respect to the mounting member 21 is varied in accordance with the vibrations created by the internal combustion engine, and mechanical stress is concentrated onto the bend x of the crimped member because the housing 41 vibrates in such a manner that the side walls of the housing 41 and mounting member 22 alternate between dissociating themselves from each other and coming into contact with each other while the center of the vibrations is at the bend x of the crimped member. Thus, the housing 41 is easily destroyed due to fatigue.

On the other hand, in the second embodiment, both the perimeter of the mounting member 22 surrounding the circle-shaped hole and the perimeter of the housing 42 surrounding the vent project outward from the housing 42, as can be seen from FIGS. 8a to 8d. Therefore, even when the housing 42 vibrates with respect to the mounting member 22, the position onto mechanical stress is concentrated is varied in the order of P, Q, R, and S. Therefore, concentration of mechanical stress onto only one position can be prevented and hence the strength of the housing 42 is better than that of the housing of the first embodiment.

Like the first embodiment, providing the end portion of the crimped member 4k of the second embodiment with notches makes it possible to prevent the crimped member from becoming cracked. Preferably, the hole formed in the mounting member 22 for securing the housing 42 may be any one of the ellipse-shaped hole 2e, as shown in FIG. 5a, the hole 2a with the notch 2f for preventing the turning of the cylindrical portion, as shown in FIG. 5b, the dodecagon-shaped hole 2g, as shown in FIG. 5c, and the hole 2a with the radial recesses 2h, as shown in FIG. 5d. Thereby, the crimped part is dug into the perimeter of the mounting member surrounding the hole, with the result that the turning of the housing 42 with respect to the mounting member 22 can be prevented.

Figure 9:
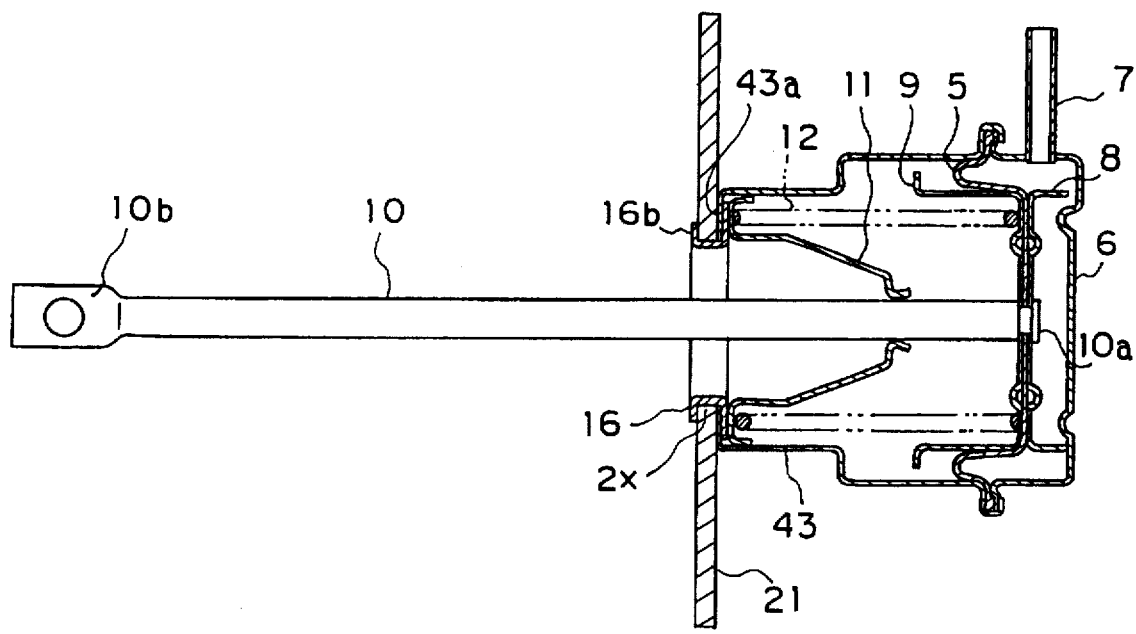
FIG. 9 is a cross-sectional view of a supercharge pressure control apparatus according to a third embodiment of the present invention.

Referring now to FIG. 9, it illustrates a cross-sectional view of a supercharge pressure control apparatus of a third embodiment of the present invention. In the figure, reference numeral 43 denotes a housing according to this embodiment, 16 denotes a member to be crimped made of a material different to that of the housing 43, and 16b denotes a cylindrical portion, which constructs the member to be crimped 16 and the free end of which is to be crimped on the mounting member 22. For example, when the housing 43 is made of SPCD, which is a material for drawing, and its thickness is about 0.8 mm for weight reduction of the supercharge pressure control apparatus, stainless steel having a thickness of 1.2 mm is used as the material of the member to be crimped 16.

Figure 10:
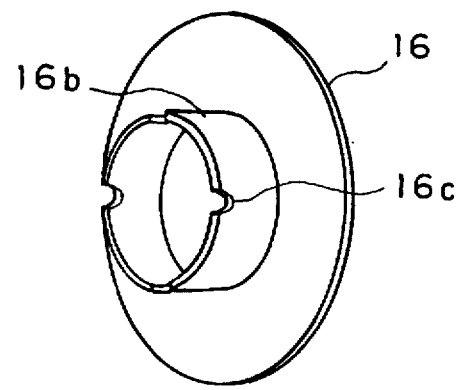
FIG. 10 is a perspective view showing a crimped portion shown in FIG. 9 before it is crimped.

Referring now to FIG. 10, it illustrates a perspective view showing the shape of the member to be crimped 16. In the figure, reference numeral 16c denotes a notch formed at the end part of the cylindrical portion 16b of the member to be crimped 16. The notches are similar to those of the cylindrical portions of the housings according to the first and second embodiments. The operation of the supercharge pressure control apparatus shown in FIG. 9 is substantially similar to that of the apparatus shown in FIG. 1, and therefore the description about the operation will be omitted hereinafter.

According to this embodiment, the member to be crimped 16 is made of a material different to that of the housing 43. Therefore, the strength of the member to be crimped 16 can be easily improved by selecting the material of the crimped member, thereby preventing the cylindrical portion 16b of the member to be crimped 16 from becoming cracked when crimping the member to be crimped.

Figure 11:
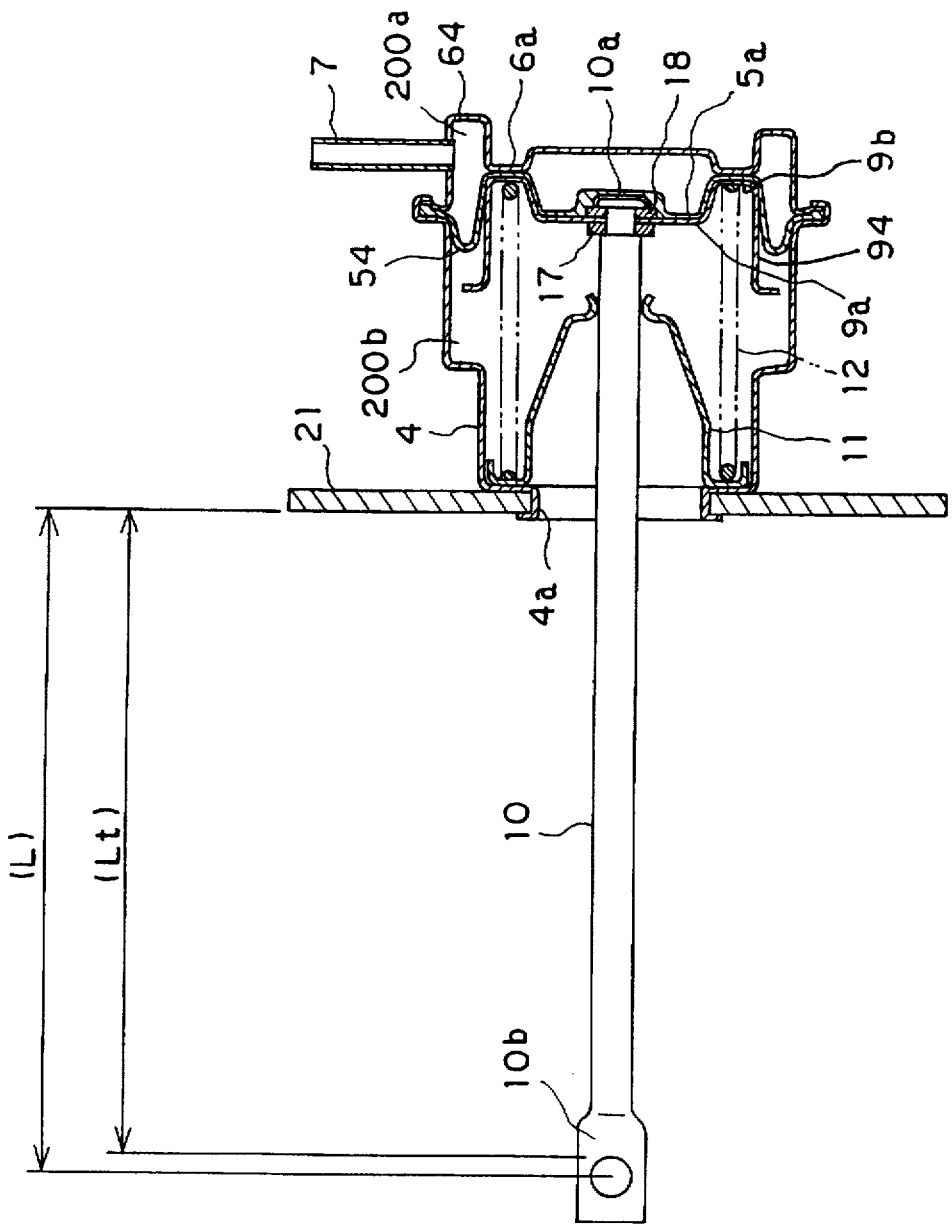
FIG. 11 is a cross-sectional view of a supercharge pressure control apparatus according to a fourth embodiment of the present invention, in which the actual length of a rod is set to be greater than the target length.

Referring now to FIG. 11, it illustrates a cross-sectional view of a supercharge pressure control apparatus according to a fourth embodiment of the present invention. In the figure, reference numeral 10 denotes a rod which is able to move in accordance with a displacement of the diaphragm 54, 64 denotes a case, 94 denotes a holder, the central portion of which is plastically deformative, rigidly secured to one end of the rod 10 by crimping, 9a denotes the plastically deformative central portion of the holder 94, 9b denotes a receiving portion disposed in the holder 94 for receiving one end of the spring 12, 17 and 18 denote upper and lower washers for crimping the central portion 9a of the holder 94 onto the rod 10 so as to secure the rod 10 to the holder 94 in such a manner that the crimped portion does not come loose due to plastic deformations of the holder 94, and 6a denotes a flat surface which constructs a part of the case 64. A part of the diaphragm 54 is sandwiched between the other surface of the case 64 opposite to the flat surface 6a and the other surface of the holder 94 opposite to the surface on which one end of the spring 12 abuts.

Figure 12:
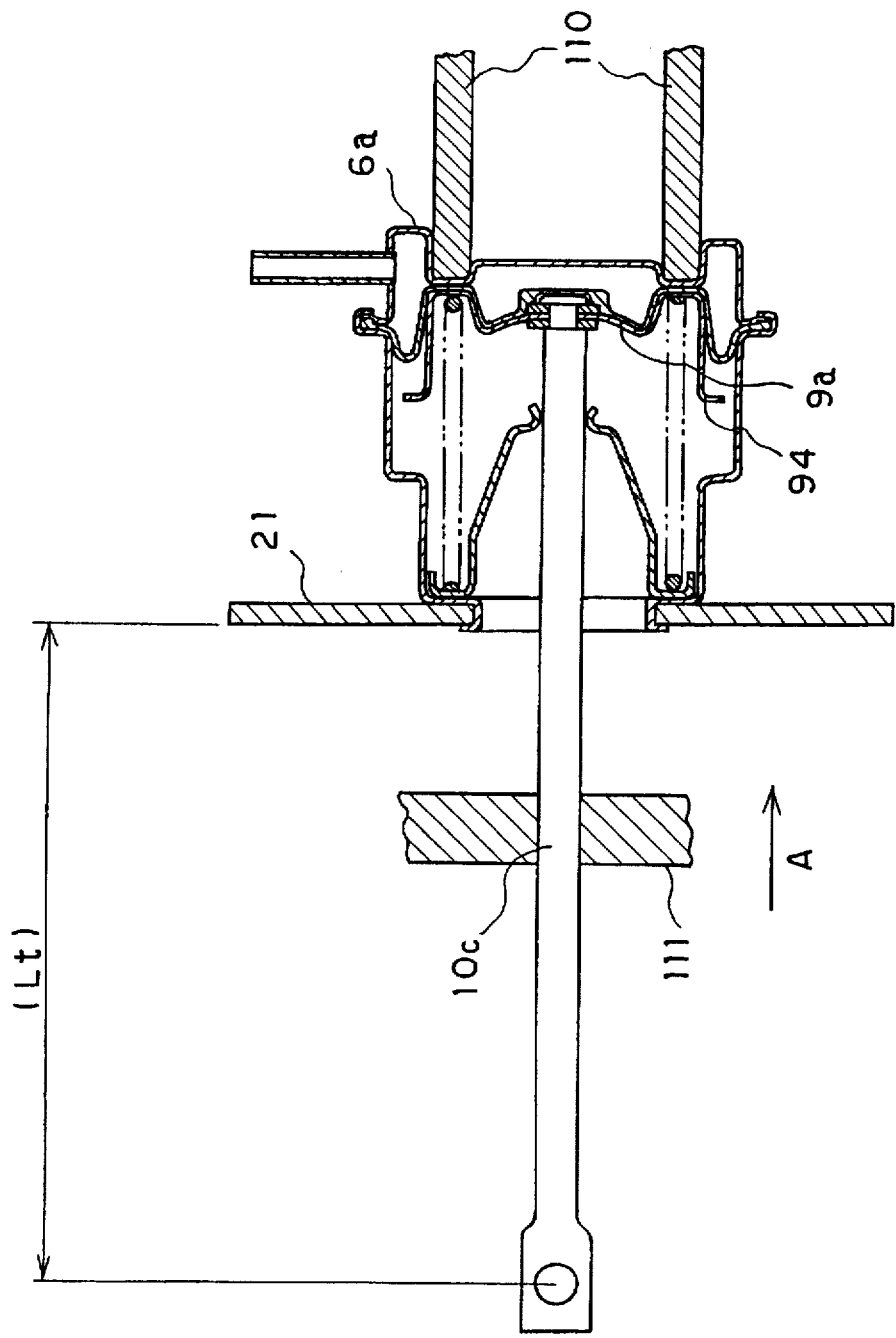
FIG. 12 is a cross-sectional view of the supercharge pressure control apparatus shown in FIG. 11, in which a holder is plastically deformed in order to position the rod.

Referring now to FIG. 12, it illustrates a cross-sectional view showing a state of the supercharge pressure control apparatus shown in FIG. 10, in which the central portion of the holder 94 is plastically deformed in order to control the position of the rod 10. In the figure, reference numeral 110 denotes a jig for supporting the flat surface 6a of the case 64, and 111 denotes a jig for holding the midpoint portion 10c of the rod 10.

In this embodiment, the actual length L of a part of the rod 10, which is visible from outside the apparatus, is set to be greater than the target length Lt, as shown in FIG. 11. Also, when it is necessary to adjust the size of the visible part of the rod 10 in order to compensate for variations in every other component size, the actual length L of the visible part of the rod 10 is set not to be smaller than the target length Lt. That is, the length L is initially set to be greater than the target length Lt. After that, the holder 94 is plastically deformed so that the length L of the visible part of the rod 10 is decreased. Finally, the rod 10 is positioned so that the length L of the visible part of the rod 10 is equal to the target length Lt. Variations in the load imposed on the spring 12 must be taken into consideration as a cause of variations in the position of the rod 10 as well as variations in every component size. To compensate for variations in the load, that is, to position the rod 10 in place, the target length Lt must be calculated in consideration of the load imposed on the spring 12. Furthermore, for positioning of the rod 10, it is necessary to measure the stroke of the rod 10 when a positive pressure is applied to the pressure room 200a. Then, the difference between the measured stroke and the target length Lt is determined. Finally, the amount of the adjustment to the length of the visible part of the rod 10, i.e., the amount of plastically deformation of the central portion 9a of the holder 94 in the direction of the axis of the rod 10 is calculated on the basis of the difference between the measured stroke and the target length Lt.

The process of deforming the central portion 9a of the holder 94 by the calculated amount of displacement is done as follows. As shown in FIG. 12, the flat surface 6a of the case 64 is supported by the jig 110. Then, the rod 10 is pushed in the direction of the arrow A while the midpoint portion 10c of the rod 10 is held by the jig 111. Finally, the rod 10 is moved until the central portion 9a of the holder 94 becomes deformed and then travels the calculated amount of displacement in the direction of the arrow A.

By providing only the central portion 9a of the holder 94 with plastic deformation characteristics, this embodiment takes precautionary measures against a deleterious effect of the deformation of the holder for positioning of the rod 10 under supercharge pressure on the spring receiving portion 9b.

Figure 13:
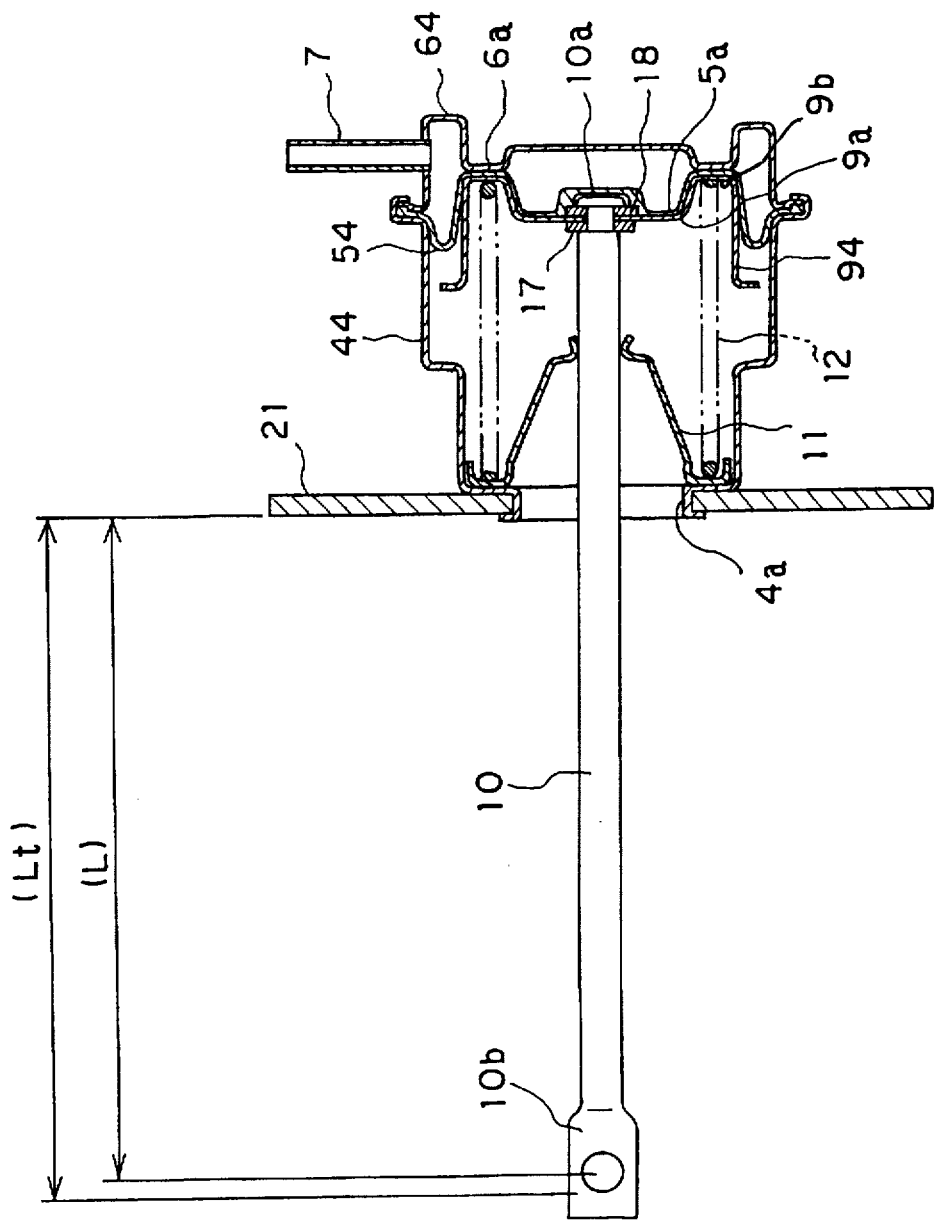
FIG. 13 is a cross-sectional view of the supercharge pressure control apparatus according to the fourth embodiment of the present invention, in which the actual length of a rod is set to be smaller than the target length.

Referring now to FIG. 13, it illustrates a cross-sectional view of a variant of the supercharge pressure control apparatus according to the fourth embodiment of the present invention. A difference between this apparatus and the apparatus shown in FIG. 11 is as follows: in the example of FIG. 11, the actual size L of the visible part of the rod 10 is set to be greater than the target length Lt, whereas, in the example of FIG. 13, the actual size L of the visible part of the rod 10 is set to be smaller than the target length Lt.

Figure 14:
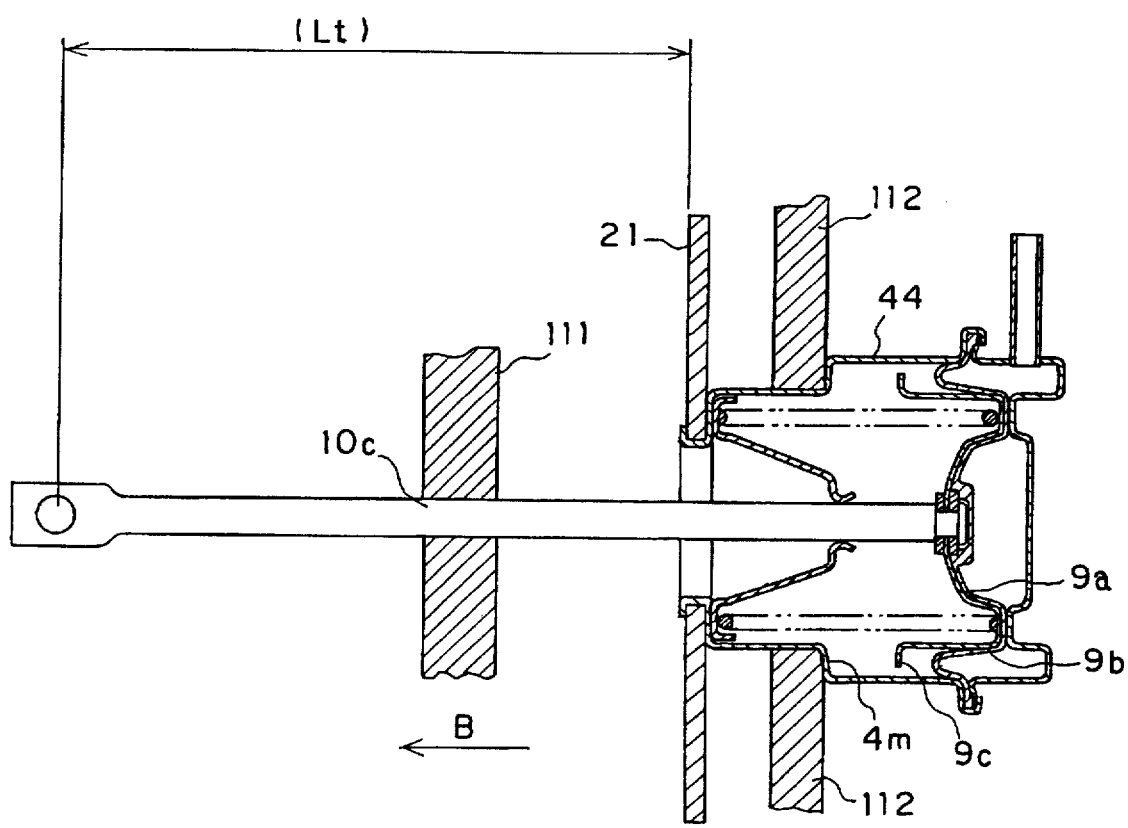
FIG. 14 is a cross-sectional view of the supercharge pressure control apparatus shown in FIG. 13, in which a holder is plastically deformed in order to position the rod.

Referring now to FIG. 14, it illustrates a cross-sectional view showing a state of the supercharge pressure control apparatus shown in FIG. 13, in which the central portion of the holder 94 is plastically deformed in order to position the rod 10. In the figure, reference numeral 112 denotes a jig for holding the cylindrical portion 4m of the housing 44.

Next, the description will be directed to a method of positioning the rod with reference to FIGS. 13 and 14. First, the stroke of the rod 10 is measured for a positive pressure applied to the pressure room A. Then, the difference between the measured stroke and the target length Lt is determined. Finally, the amount of the adjustment to the length of the visible part of the rod 10, i.e., the amount of plastic deformation of the central portion 9a of the holder 94 is calculated on the basis of the difference between the measured stroke and the target length Lt. Then, the process of deforming the central portion 9a of the holder 94 by the calculated amount of displacement is done as follows. As shown in FIG. 14, the cylindrical portion 4m of the housing 44 is held by the jig 112. Then, the rod 10 is pushed in the direction of the arrow B while the midpoint portion 10c of the rod 10 is held by the jig 111. Finally, the rod 10 is moved until the central portion 9a of the holder 94 becomes deformed and then travels the calculated amount of displacement in the direction of the arrow B.

Thus, this embodiment also takes precautionary measures against a deleterious effect of the deformation of the holder for positioning of the rod 10 under supercharge pressure on the spring receiving portion 9b even though the central portion 9a of the holder 94 is deformed in the direction opposite to that in the case of FIG. 12, as in the case of FIG. 12.

In the first embodiment shown in FIG. 1, the diaphragm 5 is sandwiched between the pressure room-side holder 8 and the atmospheric pressure room-side holder 9, whereas, in the fourth embodiment shown in FIGS. 11 to 14, the circumferential portion of the diaphragm 54 is supported by the flat surface 6a of the case 64 rather than the pressure room-side holder in the first pressure room A. If the diaphragm 54 were supported by a protrusion projecting from the case instead of the flat surface 6a, it would easily be torn by the projection. However, according to this embodiment, since the diaphragm 54 is sandwiched between the flat surface 6a of the case 64 and the portion of the holder 94 which cannot be plastically deformed, the diaphragm 54 does not sustain damage even when plastically deforming the central portion 9a of the holder 94 in order to position the rod 10 in place.

The diaphragm 54 is so formed as to extend along projections and depressions of the holder 94. Thus, the central portion 9a of the holder 94 and crimped portion 10a of the rod 10 are located opposite to each other, with little space between them. Since the diaphragm 54 is positioned in place with respect to the holder 94 when it is assembled into the housing, its position does not vary even if the pressure of gas applied to the first pressure room 200a varies.

Furthermore, since there is no space between the central portion 9a of the holder 94 and the central portion 5a of the diaphragm 54, the central portion of the diaphragm 54 does not move even when the supercharge pressure is applied to the first pressure room 200a. Therefore, no friction between the crimped portion 10a and the diaphragm 54 is produced. The structure can ensure the durability of the diaphragm 54.

The operation of the supercharge pressure control shown in FIGS. 11 to 14 is substantially similar to that of the apparatus shown in FIG. 1 and therefore the description about the operation will be omitted hereinafter.

Figure 15:
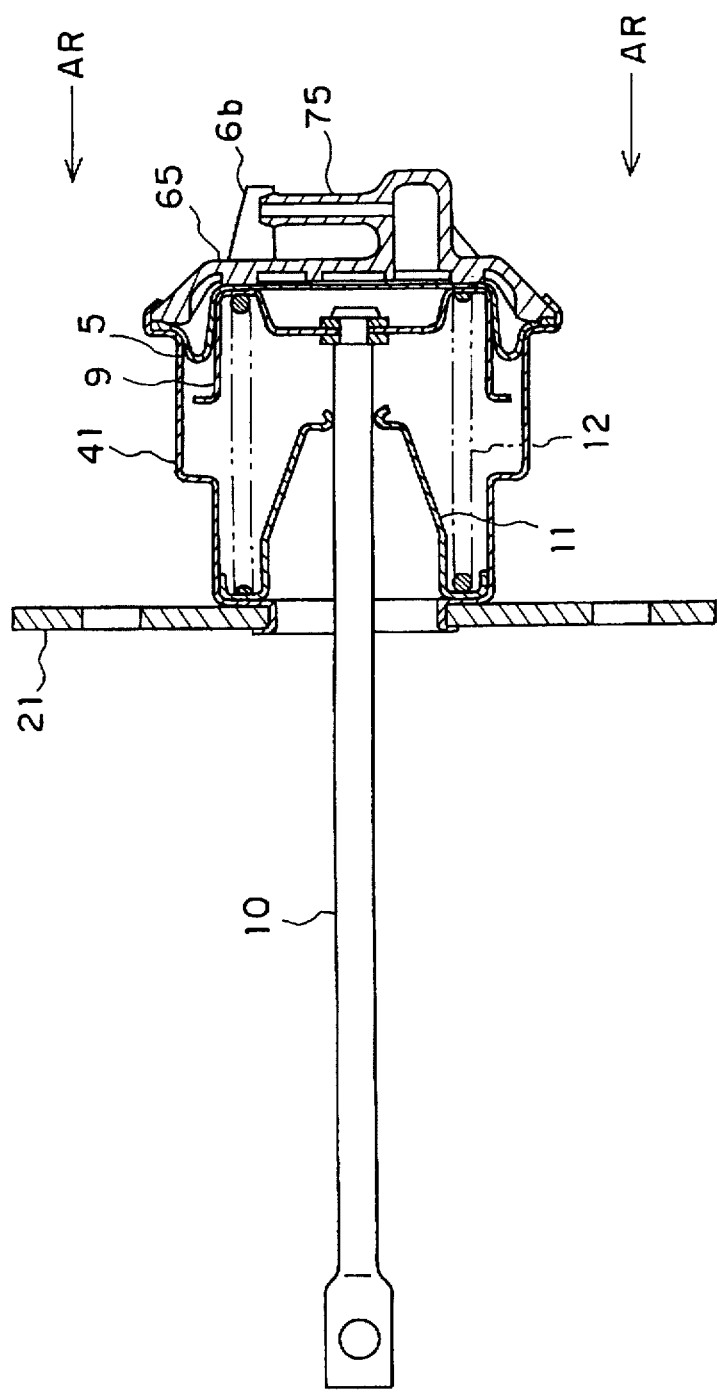
FIG. 15 is a cross-sectional view of a supercharge pressure control apparatus according to a fifth embodiment of the present invention.
Figure 16:
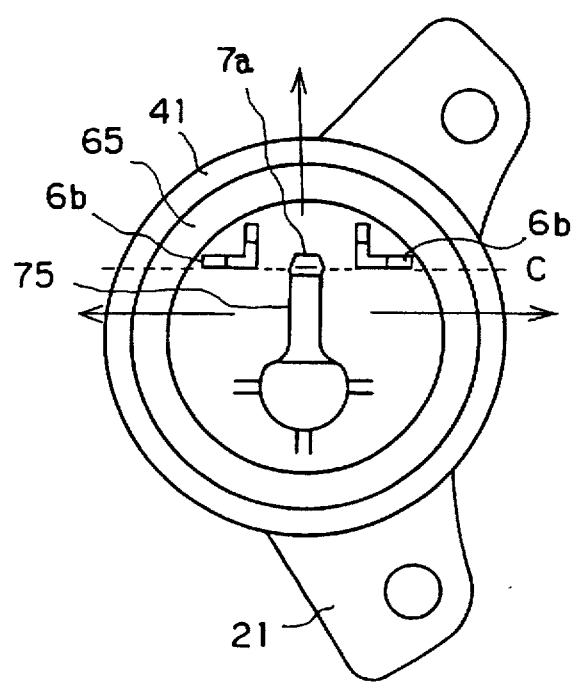
FIG. 16 is a side view of the supercharge pressure control apparatus shown in FIG. 15 when viewed in the direction of the arrow AR.
Figure 17:
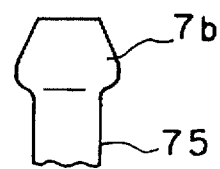
FIG. 17 is a partly enlarged side view of the apparatus shown in FIG. 16.

Referring now to FIG. 15, it illustrates a cross-sectional view of a supercharge pressure control apparatus according to a fifth embodiment of the present invention. Furthermore, FIG. 16 shows a side view of the supercharge pressure control apparatus shown in FIG. 15, when viewed in the direction of the arrow AR. FIG. 17 shows a partly enlarged view of the apparatus of FIG. 16.

In FIG. 15, reference numeral 65 denotes a case made of for example PPS resin, PA resin, a mixture of various resins, or the like, and having a pressure applying port 75 integrally formed thereon. In FIG. 16, reference numeral 6b denotes a projection for preventing the pressure applying port 75 from becoming broken due to impacts and vibrations from outside the apparatus, and 7a denotes the free end portion of the pressure applying port 75.

Although the strength of the pressure applying port 75 is reduced due to the resinification, measures are taken to prevent it from becoming broken. As shown in FIG. 16, the pressure applying port 75 extends in approximately parallel with the top surface of the case 65, and the two projections 6b project from the top surface of the case 65 and on both sides of the end portion 7a of the pressure applying port 75 so that they are higher than the port. The end portion 7a of the pressure applying port 75 is provided with a bulge 7b for preventing a hose for supplying supercharges from being removed therefrom. For reasons of arranging a metallic mold for molding the case 65, the projections 6b on both sides of the port are located forward of a broken line C crossing over the center of the balge 7b on the front end side of the pressure applying port 75. The arrows in the figure indicate the directions in which pieces of the metallic mold are removed.

The operation of the supercharge pressure control shown in FIG. 15 is substantially similar to that of the apparatus shown in FIG. 1 and therefore the description about the operation will be omitted hereinafter.

Figure 18:
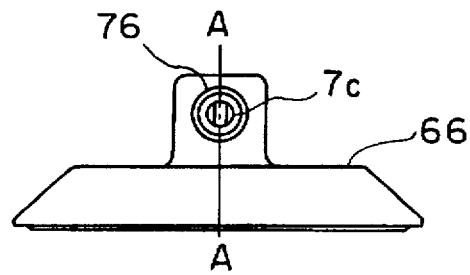
FIG. 18 is a cross-sectional view of a supercharge pressure control apparatus according to a sixth embodiment of the present invention, showing only a case of the apparatus.
Figure 19:
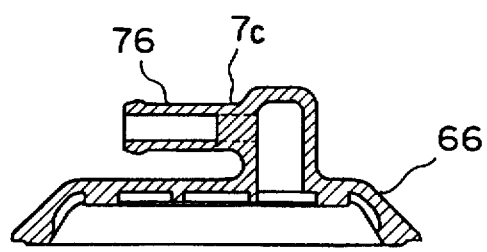
FIG. 19 is a cross-sectional view of the case and is taken along the line A—A of FIG. 18.
Figure 21:
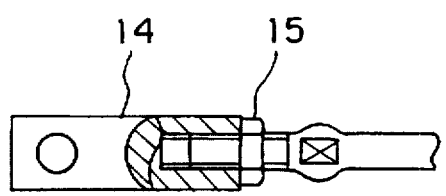
FIG. 21 is a view showing a method of adjusting the length of a rod in the prior art supercharge pressure control apparatus.

Referring now to FIG. 18, it illustrates a side view of a supercharge pressure control apparatus according to a sixth embodiment of the present invention, showing only a case of the apparatus. Furthermore, FIG. 19 shows a cross-sectional view taken along the line A—A of FIG. 18. In these figures, 66 denotes a case made of for example PPS resin, PA resin, a mixture of various resins, or the like, and having a pressure applying port 76 integrally formed therein, and 7c denotes a rib disposed inside the pressure applying port 76 for preventing the port, the strength of which is reduced due to the resinification, from becoming broken.

In order to compensate for the reduction of the strength of the pressure applying port 76 due to the resinification, the rib 7c, which serves to prevent the pressure applying port 76 from becoming broken, is located inside the tube 76, as shown in FIGS. 18 and 19. Thus, the pressure applying port 76 is strengthened and prevented from becoming broken due to impacts and vibrations from outside the apparatus.

The rib 7c has the thinnest possible width so as not to obstruct the passage through which supercharges are supplied. The rib 7c can be located anywhere inside the pressure applying port 76. Preferably, it is longitudinally positioned at the root of the port onto which mechanical stress is concentrated, thereby effectively providing greater rigidity in the pressure applying port 76.

The operation of the supercharge pressure control shown in FIGS. 18 to 19 is substantially similar to that of the apparatus shown in FIG. 1 and therefore the description about the operation will be omitted hereinafter.

As previously mentioned, the present invention offers the following advantages.

In accordance with a preferred embodiment of the present invention, a supercharge pressure control apparatus comprises a crimped member for securing an enclosure of the apparatus to a mounting member fixed in an internal combustion engine by crimping, a notch formed at one end portion of the crimped member for preventing the end portion from becoming cracked, a diaphragm disposed inside the enclosure for partitioning the interior of the enclosure into a first pressure room and a second pressure room, a holder disposed on the diaphragm and inside the second pressure room, a spring disposed inside the second pressure room for urging the diaphragm in the direction of the first pressure room or in the opposite direction through the holder, and a rod which is able to move backward and forward in accordance with the pressure of gas applied to the first pressure room for controlling the pressure of air to be supplied into the internal combustion engine. Furthermore, the mounting member has a generally circle-shaped hole through which the rod is penetrated, and the crimped member is crimped over an edge portion of the means surrounding the hole so as to rigidly secure the enclosure to the mounting member. Therefore, the enclosure can be jointed to the mounting member at a low cost without having to use an expensive facility. Thus, the present invention provides the supercharge pressure control apparatus, which operates with a high degree of reliability, at a low cost.

In accordance with a preferred embodiment of the present invention, since the edge portion of the mounting member surrounding the generally circle-shaped hole is inclined outward against the enclosure, and the crimped member projects from the enclosure so that it is crimped over the inclined edge portion, concentration of stress upon only a part of the crimped member can be prevented and hence the strength of the enclosure is improved.

In accordance with a preferred embodiment of the present invention, since the crimped member is not integrally formed on the enclosure, the strength of the crimped member can be improved at will regardless of the strength of the enclosure.

In accordance with a preferred embodiment of the present invention, since the holder can be plastically deformed to control the position of the rod in accordance with the pressure of supercharges, a reduction in size accuracies of other components can be tolerated. Thereby, the cost of the supercharge pressure control apparatus can be decreased and variations in the characteristics of the apparatus can be reduced.

In accordance with a preferred embodiment of the present invention, the case and pressure applying port are formed in one piece of a resin and protecting projections are disposed on both sides of the pressure applying port for preventing the pressure applying port from becoming broken. Therefore, there is no possibility that the pressure applying port is broken due to impacts or vibrations, even though the port is made of the low-strength material.

In accordance with a preferred embodiment of the present invention, the case and pressure applying port are formed in one piece of a resin and a rib is disposed inside the pressure applying port for preventing the port from becoming broken. Therefore, there is no possibility that the pressure applying port is broken due to impacts or vibrations, even though the port is made of the low-strength material.

What is claimed is:

1. A supercharge pressure control apparatus fixed in an internal combustion engine with a mounting member, comprising:

an enclosure secured to said mounting member;

a diaphragm disposed inside said enclosure for partitioning the interior of said enclosure into a first pressure room and a second pressure room;

a holder disposed adjacent to said diaphragm and inside said second pressure room;

a spring disposed inside said second pressure room for urging said diaphragm in the direction of said first pressure room or in the opposite direction through said holder;

a rod which is able to move backward and forward in accordance with the pressure of gas applied to said first pressure room for controlling the pressure of air to be supplied into said internal combustion engine, one end of said rod being secured to said holder and the other end of said rod projecting outward from said enclosure;

a molded case which at least partially forms said first pressure room in cooperation with said diaphragm;

a housing which at least partially forms said second pressure room;

a pressure applying port integrally formed on a surface of said case and extending substantially in parallel with the surface for applying the pressure of gas to said first pressure room; and at least one projection disposed on at least one side of said pressure applying port for preventing said pressure applying port from becoming broken.

2. The supercharge pressure control apparatus as claimed in claim 1, wherein said surface of said case comprises a first surface point and a second surface point, wherein said first surface point and said second surface point respectively define a portion of said surface, wherein said pressure applying port is formed on said surface at said first surface point, wherein said pressure applying port comprises a main longitudinal axis having a first axis end and a second axis end which is substantially parallel to said portion of said surface, wherein a first distance between said first surface point and said second surface point substantially equals a second distance between said first axis end and said second axis end, and wherein said portion of said surface is substantially flat.

3. The supercharge pressure control apparatus as claimed in claim 1, wherein said at least one projection projects substantially perpendicular from said surface.

4. The supercharge pressure control apparatus as claimed in claim 2, wherein said at least one projection projects substantially perpendicular from said surface.

5. The supercharge pressure control apparatus as claimed in claim 1, further comprising a crimped member for securing said enclosure to said mounting member by crimping.

6. The supercharge pressure control apparatus as claimed in claim 5, wherein a notch is formed at an end portion of said crimped member for preventing the end portion from becoming cracked when said crimped member is crimped.

7. The supercharge pressure control apparatus according to claim 5, wherein said mounting member comprises a hole through which said rod penetrates, and wherein said crimped member is inserted through said hole and crimped over an edge portion of said mounting member surrounding said hole so as to rigidly secure said enclosure to said mounting member.

8. The supercharge pressure control apparatus according to claim 7, wherein said edge portion of said mounting member surrounding said hole is an inclined edge portion which is inclined away from said enclosure, and wherein said crimped member projects from said enclosure and is crimped over said inclined edge portion.

9. The supercharge pressure control apparatus according to claim 7, wherein said crimped member is not integrally formed with said enclosure, and wherein said enclosure is mounted on said mounting member in such a manner that an end portion of said enclosure is sandwiched between said crimped member and said edge portion of said mounting member.

10. The supercharge pressure control apparatus according to claim 1, wherein said holder is deformable in order to control a position of said rod in accordance with a supercharge pressure.

11. The supercharge pressure control apparatus according to claim 1, further comprising a rib disposed inside said pressure applying port for preventing said port from becoming broken.

12. The supercharge pressure control apparatus according to claim 10, wherein a first length of said rod extends outside of said mounting member when said holder is not deformed and said pressure of said gas in said first pressure room is such that said diaphragm is not moved against an urging force of said spring, wherein a target length of said rod extends outside of said mounting member when said holder is deformed a predetermined amount and said pressure of said gas in said first pressure room is such that said diaphragm is not moved against an urging force of said spring, and wherein said first length is greater than said target length.

13. The supercharge pressure control apparatus according to claim 10, wherein a first length of said rod extends outside of said mounting member when said holder is not deformed and said pressure of said gas in said first pressure room is such that said diaphragm is not moved against an urging force of said spring, wherein a target length of said rod extends outside of said mounting member when said holder is deformed a predetermined amount and said pressure of said gas in said first pressure room is such that said diaphragm is not moved against an urging force of said spring, and wherein said first length is less than said target length.

14. The supercharge pressure control apparatus according to claim 1, wherein a plurality of projections are disposed on at least two sides of said pressure applying port.

15. A supercharge pressure control apparatus fixed in an internal combustion engine with a mounting member, comprising:

an enclosure secured to said mounting member;

a diaphragm disposed inside said enclosure for partitioning the interior of said enclosure into a first pressure room and a second pressure room;

a holder disposed adjacent to said diaphragm and inside said second pressure room;

a spring disposed inside said second pressure room for urging said diaphragm in the direction of said first pressure room or in the opposite direction through said holder;

a rod which is able to move backward and forward in accordance with the pressure of gas applied to said first pressure room for controlling the pressure of air to be supplied into said internal combustion engine, one end of said rod being secured to said holder and the other end of said rod projecting outward from said enclosure;

a molded case which at least partially forms said first pressure room in cooperation with said diaphragm;

a housing which at least partially forms said second pressure room;

a pressure applying port integrally formed on a surface of said case and extending substantially in parallel with the surface for applying the pressure of gas to said first pressure room; and a rib disposed inside said pressure applying port for preventing said port from becoming broken.

16. The supercharge pressure control apparatus as claimed in claim 15, further comprising a crimped member for securing said enclosure to said mounting member by crimping.

17. The supercharge pressure control apparatus as claimed in claim 16, wherein a notch is formed at an end portion of said crimped member for preventing the end portion from becoming cracked when said crimped member is crimped.

18. The supercharge pressure control apparatus according to claim 16, wherein said mounting member comprises a hole through which said rod penetrates, and wherein said crimped member is inserted through said hole and crimped over an edge portion of said mounting member surrounding said hole so as to rigidly secure said enclosure to said mounting member.

19. The supercharge pressure control apparatus according to claim 15, wherein said holder is deformable in order to control a position of said rod in accordance with a supercharge pressure.

* * * * *